(12) United States Patent
Lischer

(10) Patent No.: US 9,500,119 B2
(45) Date of Patent: Nov. 22, 2016

(54) TURBOCHARGER

(75) Inventor: Thomas Lischer, Neustadt (DE)

(73) Assignee: BorgWarner Inc., Auburn Hills, MI (US)

( * ) Notice: Subject to any disclaimer, the term of this patent is extended or adjusted under 35 U.S.C. 154(b) by 606 days.

(21) Appl. No.: 13/577,061

(22) PCT Filed: Feb. 1, 2011

(86) PCT No.: PCT/US2011/023295
§ 371 (c)(1),
(2), (4) Date: Aug. 3, 2012

(87) PCT Pub. No.: WO2011/102959
PCT Pub. Date: Aug. 25, 2011

(65) Prior Publication Data
US 2012/0297768 A1    Nov. 29, 2012

(30) Foreign Application Priority Data

Feb. 17, 2010 (DE) .......................... 10 2010 008 299

(51) Int. Cl.
*F02B 33/44* (2006.01)
*F02B 37/00* (2006.01)
*F01N 3/021* (2006.01)

(52) U.S. Cl.
CPC .............. *F02B 37/00* (2013.01); *F02M 26/06* (2016.02); *F02M 26/19* (2016.02); *F01N 3/021* (2013.01); *F02M 26/15* (2016.02); *Y02T 10/121* (2013.01); *Y02T 10/144* (2013.01)

(58) Field of Classification Search
CPC .............. Y02T 10/121; Y02T 10/144; F02M 25/0709; F02M 25/0722; F02M 35/10118; F02M 35/10222; F02B 29/0406

USPC ............ 60/605.1, 605.2; 123/568.11, 568.17
See application file for complete search history.

(56) References Cited

U.S. PATENT DOCUMENTS

| 7,845,340 | B2* | 12/2010 | Fuchinoue et al. ...... 123/568.17 |
| 8,056,338 | B2* | 11/2011 | Joergl et al. .................. 60/605.2 |
| 8,746,216 | B2* | 6/2014 | Elsasser et al. .......... 123/568.11 |
| 2009/0101123 | A1* | 4/2009 | Brogdon et al. ......... 123/568.15 |

FOREIGN PATENT DOCUMENTS

| JP | 2007224802 A | * | 9/2007 | ............. F02M 25/07 |
| JP | 2008232091 A | * | 10/2008 | ............. F02M 25/07 |
| WO | WO 2006129371 A1 | * | 12/2006 | ......... F02M 25/0722 |

* cited by examiner

*Primary Examiner* — Thomas Denion
*Assistant Examiner* — Thomas Olszewski
(74) *Attorney, Agent, or Firm* — A. Michael Tucker; Stephan A. Pendorf; Patent Central LLC

(57) ABSTRACT

The present invention relates to a turbocharger (1) for an internal combustion engine (2), having at least one low-pressure exhaust-gas recirculation line (3) which opens out via an exhaust-gas mixing-in opening (12) into an intake line (10) of the internal combustion engine (2); having a turbine (4) and having a compressor (5) which is drive-connected to the turbine (4) and which has a compressor wheel (6) which is arranged in a compressor housing (7) into which the intake line (10) opens out via a compressor inlet (11), and having a mixing device (18) for mixing recirculated exhaust gas ($A_G$) and fresh air (FL), characterized in that the mixing device (18) has an inflow distributor (21) in which the exhaust-gas recirculation line (3), which extends at least substantially along the longitudinal axis (L) thereof, and the intake line (10), which extends at least substantially at right angles to the longitudinal axis (L), open out, and in that, as viewed in the flow direction (R) of the exhaust gases ($A_G$), an impact plate (23) is provided downstream of an outflow opening (22) of the exhaust-gas recirculation line (3).

10 Claims, 2 Drawing Sheets

TURBOCHARGER

BACKGROUND OF THE INVENTION

1. Field of the Invention

The invention relates to a turbocharger according to the preamble of claim 1.

2. Background of the Invention

A generic turbocharger is known from WO 2008/095658 A1.

Turbochargers of said type are used in internal combustion engines which, in order to meet the legally prescribed exhaust-gas limit values, recirculate large exhaust-gas quantities into the intake path of the engine over a wide operating range. In low-pressure exhaust-gas recirculation (LP-EGR), exhaust gas is supplied to the fresh-air flow upstream of the compressor of the turbocharger. If this mixing is not effective, exhaust-gas-laden strands at elevated temperature are drawn through the compressor.

This non-uniform mixing of the exhaust gas with the fresh air can lead to rotationally asymmetrical depositions of the unburned hydrocarbons and of the soot at one side in the compressor housing. As a result of the single-sided blockage of the diffuser region, consequential damage can then be expected, as a result of the increasing radial thrust, to the compressor wheel as a result of rubbing and to the bearing arrangement as a result of additional radial forces. To make the unavoidable depositions more uniform, therefore, a rotationally symmetrical mixing profile of the compressor supply flow is preferable. This is also the case in particular with regard to a uniform speed profile at the compressor wheel inlet.

SUMMARY OF THE INVENTION

It is therefore an object of the present invention to provide a turbocharger for an internal combustion engine according to the preamble of claim 1, which turbocharger overcomes the abovementioned disadvantages and in particular seeks to improve the mixing of the recirculated exhaust gas with the fresh intake air over the shortest possible distance, and to obtain as rotationally symmetrical a mixing profile as possible.

Said object is achieved by means of the features of claim 1.

As a result of the design of the mixing device according to the invention and of the turbocharger according to the invention, it is achieved firstly that the fresh intake air is supplied to the compressor radially via the inflow distributor. Here, the low-pressure exhaust-gas recirculation supply flow runs axially, that is to say in the direction of the longitudinal axis of the inlet distributor. To obtain as rotationally symmetrical and fast a mixture as possible, the jet of the recirculated exhaust gases is directed toward an impact plate. Said impact plate advantageously generates the radial distribution of the low-pressure exhaust-gas recirculation supply flow. Furthermore, it is advantageously obtained that any water droplets present in the recirculated exhaust-gas flow are reduced in size by the impact plate, which leads to a minimization of droplet impact against the compressor wheel.

Here, tests and analysis carried out within the context of the invention have shown that the arrangement according to the invention generates a uniform and rotationally symmetrical speed and temperature profile already a very short mixing distance downstream of the outlet of the recirculated exhaust gases. Here, the temperature distribution is identical to the mixing field of the exhaust-gas components.

The subclaims relate to advantageous refinements of the invention.

BRIEF DESCRIPTION OF THE DRAWINGS

Further details, advantages and features of the invention will emerge from the following description of an exemplary embodiment and from the drawing, in which.

DETAILED DESCRIPTION OF THE INVENTION

Figure 1:
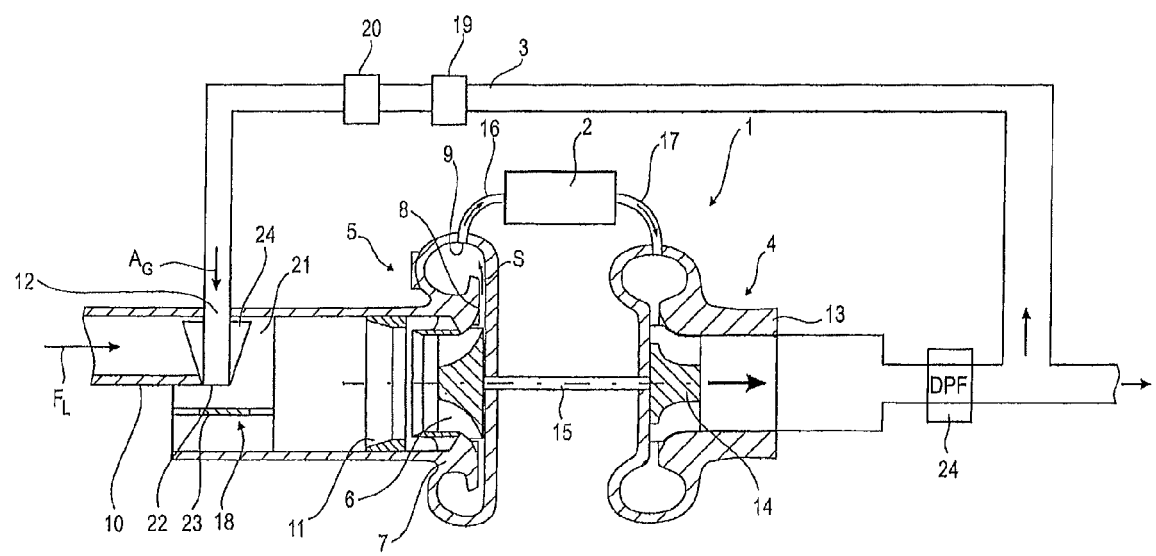
FIG. 1 shows a schematically highly simplified sectional illustration of a turbocharger according to the invention.

The turbocharger 1 illustrated in FIG. 1 has a turbine 4 with a turbine wheel 14 arranged in a turbine housing 13. Said turbine wheel 14 is connected via a rotor shaft 15 to a compressor wheel 6, which is arranged in a compressor housing 7, of a compressor 5.

An exhaust-gas recirculation line 3 from an engine 2 leads preferably via a regulating valve 19 and a cooler 20 into an intake line 10 of the engine 2 through an exhaust-gas mixing-in opening 12. In the intake line 10, a mixing device 18 is arranged upstream of the compressor inlet 11.

Also illustrated are a supply line 16 from the compressor inlet 9 to the engine 2, and an exhaust-gas line 17 from the engine 2 to the turbine housing 13.

As a result of this arrangement according to the invention of the exhaust-gas recirculation line 3, the exhaust gas $A_G$ is conducted through the exhaust-gas mixing-in opening 12 into the intake line 10. Here, the exhaust gas $A_G$ impinges on the fresh air $F_L$, which is then mixed together in the flow direction of the fresh air $F_L$ through the mixing device 18. After the virtually complete mixing of the two mass flows, the mixture flows through the compressor inlet 11 into the diffuser 8.

Figure 2:
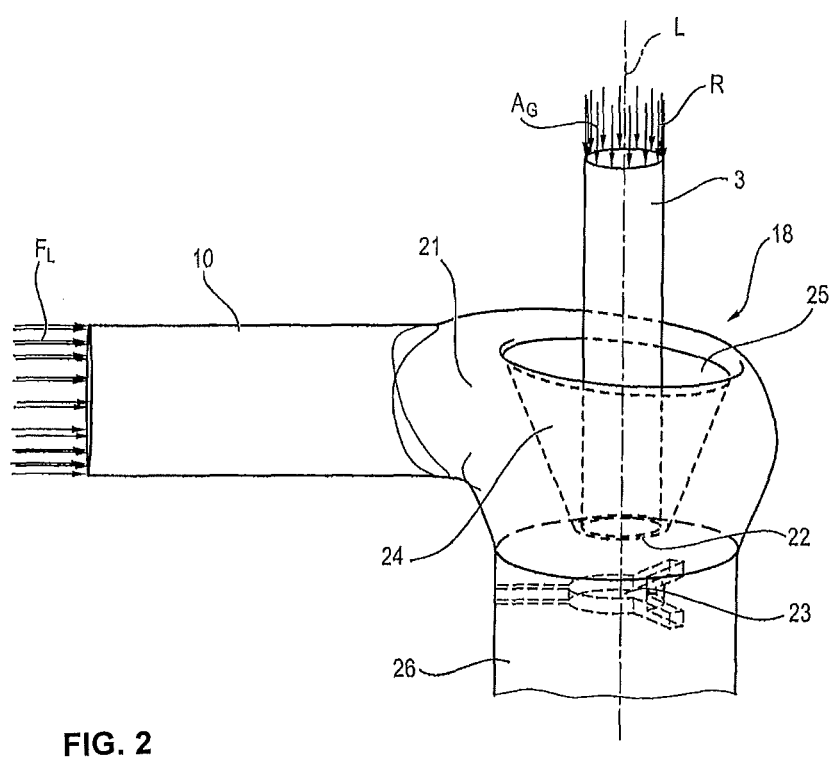
FIG. 2 shows a schematically highly simplified diagram showing the principle of a particularly preferred embodiment of the mixing device according to the invention.

As can be seen from a juxtaposition of FIGS. 1 and 2, the mixing device 18 according to the invention has an inflow distributor 21 in which firstly the intake line 10 for the supply of fresh air $F_L$ opens out and into which secondly the exhaust-gas recirculation line 3 is conducted. As can be seen in particular from the illustration of FIG. 2, the two lines 3 and 10 are at least substantially at right angles to one another, preferably at an angle of exactly 90°. Said arrangement results in a radial introduction of fresh air $F_L$, and an introduction of exhaust gas at least substantially along the longitudinal axis L of the inflow distributor 21.

In the particularly preferred embodiment illustrated in FIG. 2, a guide cone 24 is arranged in the inflow distributor 21, which guide cone 24 tapers, proceeding from its inlet 25, in the flow direction R of the exhaust gases $A_G$. The exhaust-gas recirculation line 3 opens out into said guide cone 24, which exhaust-gas recirculation line 3 has an outflow opening 22 at its end. An impact plate 23 is provided downstream of said outflow opening 22 as viewed in the flow direction R of the exhaust gases $A_G$, toward which impact plate the supplied exhaust-gas flow $A_G$ is conducted. Here, the impact plate 23 can be fixed in a suitable way for example in a pipe connector 26 which adjoins the inflow distributor 21, or in the inflow distributor 21 itself.

As explained in the introduction, said arrangement yields the advantage that the impact plate 23 effects the radial distribution of the supplied exhaust gases $A_G$ and, furthermore, reduces the size of any water droplets present in the recirculated exhaust-gas flow.

To supplement the disclosure, reference is made explicitly to the diagrammatic illustration of the invention in FIGS. 1 and 2.

LIST OF REFERENCE SYMBOLS

1 Turbocharger/exhaust-gas turbocharger
2 Engine
3 Exhaust-gas recirculation line
4 Turbine
5 Compressor
6 Compressor wheel
7 Compressor housing
8 Diffuser
9 Compressor outlet
10 Intake line
11 Compressor inlet
12 Exhaust-gas mixing-in opening
13 Turbine housing
14 Turbine wheel
15 Rotor shaft
16 Supply line
17 Exhaust-gas line
18 Mixing device
19 Regulating valve
20 Cooler
21 Inflow distributor
22 Outflow opening
23 Impact plate
24 Guide cone
25 Inlet
26 Pipe connector
$A_G$ Exhaust gas
$F_L$ Fresh air
L Longitudinal axis
R Flow direction of the exhaust gases $A_G$

The invention claimed is:

1. A turbocharger (1) for an internal combustion engine (2), comprising
a fresh air intake line in which the fresh air has a direction of flow,
an inflow distributor (21) having an inlet and an outlet, wherein said fresh air intake line introduces fresh air into said inflow distributor inlet, said inflow distributor (21) forming a right angle in which the direction of flow of the fresh air is changed prior to reaching said outlet, wherein in said inflow distributor (21) the flow of fresh air is directed around a guide cone (24) as it changes direction,
at least one low-pressure exhaust-gas recirculation line (3) which takes in exhaust gas from downstream of the turbine and opens out via an exhaust-gas outflow opening (22) into the inflow distributor (21) after the direction of flow of the fresh air from the intake line (10) has been changed;
a turbine (4) driven by exhaust gas from said engine (2), and
a compressor (5)
which is drive-connected to the turbine (4) and which has a compressor wheel (6) which is arranged in a compressor housing (7), into which compressor housing the inflow distributor (21) discharges via a compressor inlet (11), and
wherein an impact plate (23) is provided downstream of the inflow distributor (21), perpendicular to the flow direction (R) of the exhaust gases, and close enough to the outflow opening (22) to impart a radial distribution and mixing of the low-pressure exhaust gas into the stream of the fresh air upstream of the compressor inlet.

2. The turbocharger as claimed in claim 1, wherein the low-pressure exhaust-gas recirculation line (3) is coaxial with said guide cone (24).

3. The turbocharger as claimed in claim 1, wherein the exhaust-gas recirculation line (3) discharges in the guide cone (24).

4. The turbocharger as claimed in claim 1, wherein the impact plate (23) is arranged substantially parallel to the flow direction of the compressor inlet.

5. The turbocharger as claimed in claim 1, wherein the impact plate (23) is arranged substantially perpendicular to the flow direction of the compressor inlet.

6. A mixing device (18) for mixing recirculated exhaust gas ($A_G$) and fresh air ($F_L$) of a turbocharger (1) for an internal combustion engine (2), having
at least one low-pressure exhaust-gas recirculation line (3) which opens out via an exhaust-gas outflow opening (22) into an intake line (10) of the internal combustion engine (2);
a turbine (4) and
a compressor (5)
which is drive-connected to the turbine (4) and which has a compressor wheel (6) which is arranged in a compressor housing (7), into which compressor housing the intake line (10) discharges via a compressor inlet (11),
a mixing device (18) for mixing recirculated exhaust gas ($A_G$) and fresh air (FL),
an inflow distributor (21) oriented at least substantially around a longitudinal axis (L), wherein the combustion air intake line (10) enters the inflow distributor (21) at right angles to the longitudinal axis (L) and exits the inflow distributor (21) in the direction the longitudinal axis (L), wherein the exhaust-gas recirculation line (3) extends through the inflow distributor (21) at least substantially along the longitudinal axis (L) of the inflow distributor (21) and discharges the recirculated exhaust gas ($A_G$) in a flow direction (R) along the longitudinal axis (L) of the inflow distributor (21), and
an impact plate (23) which is arranged downstream of the outlet opening (22) of the supply line (3) as viewed in the flow direction (L) of the exhaust gases ($A_G$), perpendicular to the flow direction (R) of the exhaust gases, and close enough to the outflow opening (22) to impart a radial distribution and mixing of the low-pressure exhaust gas into the stream of the fresh air upstream of the compressor inlet.

7. The mixing device as claimed in claim 6, wherein a guide cone (24) is arranged in the inflow distributor (21).

8. The mixing device as claimed in claim 6, wherein the exhaust-gas recirculation (3) opens out in the guide cone (24).

9. The mixing device as claimed in claim 6, wherein the impact plate (23) is arranged substantially parallel to the flow direction of the compressor inlet.

10. The mixing device as claimed in claim 6, wherein the impact plate (23) is arranged substantially perpendicular to the flow direction of the compressor inlet.

* * * * *